INVENTOR.
DEREK SWAINE
BY
Robert E. Strauss
ATTORNEY

INVENTOR.
DEREK SWAINE
BY
Robert E. Strausser
ATTORNEY

United States Patent Office 3,419,673
Patented Dec. 31, 1968

3,419,673
CONTROL APPARATUS FOR COLOR TELEVISION RECEIVERS

Derek Swaine, Batavia, N.Y., assignor to Sylvania Electric Products Inc., a corporation of Delaware
Filed Apr. 5, 1966, Ser. No. 540,394
6 Claims. (Cl. 178—5.4)

ABSTRACT OF THE DISCLOSURE

In a color television receiver circuit, a pulse signal is coupled to the cathodes of a color cathode ray tube to provide signal blanking during the scan retrace period and in combination with a DC potential source to provide a reference potential for "setting up" a color cathode ray tube upon interruption of an applied luminance signal.

Figure 1:
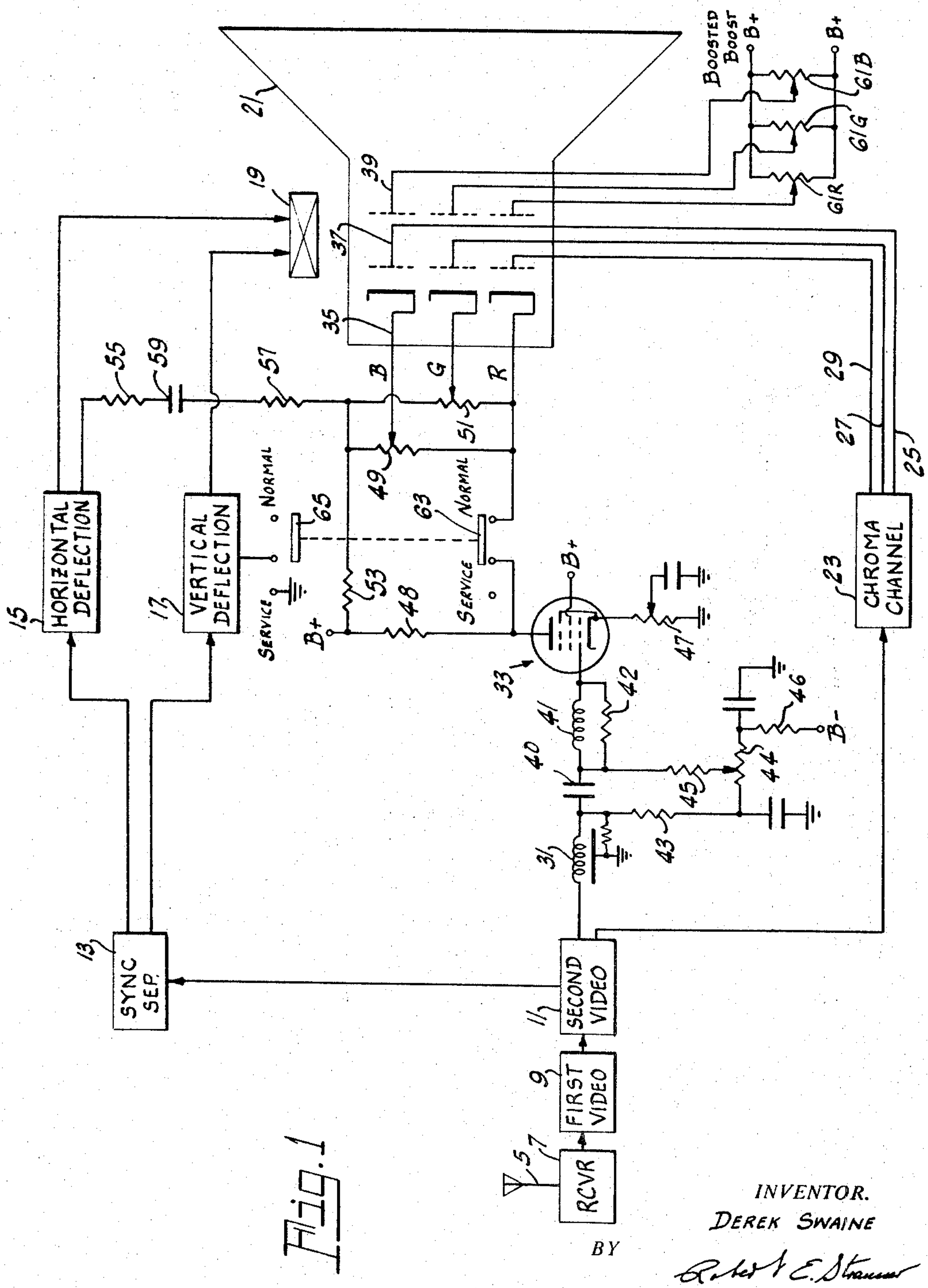

This invention relates to color television receivers and more particularly to circuitry for controlling the operation of a color cathode ray tube employed therein.

Present-day color television receivers commonly employ a multigun cathode ray tube such as the well-known "shadow-mask" tube with associated apparatus to achieve deflection of the electron beams from the guns in a horizontal and vertical direction. Also, the receiver includes a luminance channel for applying a monochrome signal to the cathode ray tube and a chrominance channel which provide a plurality of color difference signals for application to the cathode ray tube.

Because color cathode ray tubes employ a multiplicity of phosphors having varying response characteristics and multiple electron guns having different electrical characteristics and it is desirable not only to obtain maximum picture brightness but maintain proper color temperature at all brightness levels, it has been found that the receiver must include circuitry for controlling the operational characteristics of the cathode ray tube. Moreover, operation of the cathode ray tube must be controlled not only during the application of signals thereto but also must be preconditioned or "set-up" initially to assure faithful reproduction of the above-mentioned signals.

In the prior art, it has been suggested that operation of the color cathode ray tube be controled by apparatus which includes an individual adjustable voltage potential control for each screen grid, an adjustable bias control common to all control grids, means including at least one adjustable control for applying drive signals to the cathodes, and means for applying a pulse voltage to each of the control grids. Further, a first switch was provided for interrupting the application of a drive signal to the cathodes and substituting a reference voltage derived from a voltage source within the receiver by way of a voltage divider network. Also, a second switch was provided for alternative enablement and disablement of an electron beam deflection development means.

While the above-mentioned apparatus has contributed to the development and acceptance of color television receivers and control of the operation of color cathode ray tubes, it has been found that such apparatus is not only unduly complicated but also relatively expensive. Moreover, development and advancement in the cathode ray and receiving tube arts has permitted the utilization of unique and less expensive apparatus.

Therefore, it is an object of this invention to provide novel and simplified circuitry for controlling the operation of a color cathode ray tube in a color television receiver.

Another object of the invention is to enhance the operational control of a color cathode ray tube in a color television receiver by providing relatively uncomplicated and inexpensive control circuitry.

A further object of the invention is to utilize a pulse voltage in the dual capacity of blanking a color picture tube during the horizontal retrace period of operation, and in combination with a fixed DC potential, to provide a suitable black level reference potential during pre-conditioning or "set-up" of a color cathode ray tube.

These objects are achieved in one aspect of the invention by apparatus for controlling the operation of a color cathode ray tube including individual voltage potential controls for each screen grid, means for coupling a drive signal and a pulse voltage to the cathodes including at least one adjustable control for applying drive signals to the cathodes. Additionally, a first switch may be provided for interrupting the application of the drive signal to the cathodes and a second switch for interrupting the application of an electron beam deflection signal to the deflection apparatus associated with the cathode ray tube.

Figure 2:
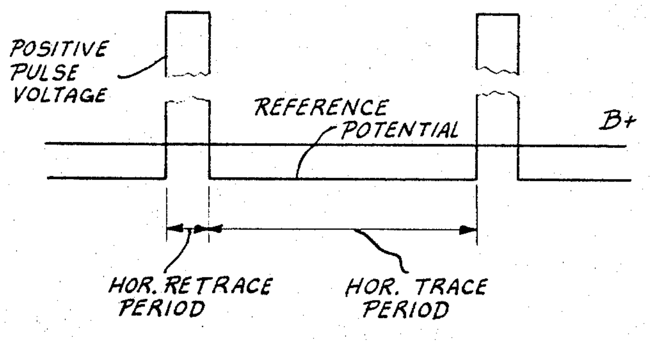

For a better understanding of the present invention, together with other and further objects, advantages, and capabilities thereof, reference is made to the following disclosure and appended claims in connection with the accompanying drawings in which:

FIG. 1 illustrates a color television receiver, in block and schematic form, embodying improved circuitry for effecting control of the operation of a color cathode ray tube; and FIG. 2 is a diagrammatic illustration showing the reference level or potential at the cathodes of a color cathode ray tube at the time of preconditioning or set-up thereof.

Referring to the drawings, FIG. 1 is illustrative of a color television receiver. Generally, the receiver includes an antenna 5 for intercepting a transmitted color television signal and applying the intercepted signal to a signal receiver 7. The receiver 7 includes the usual R.F. amplifier, mixer, I.F. amplifier, and video detector stages and provides a composite video signal which is coupled via first video amplifier stage 9 to a second video amplifier stage 11 having a plurality of signal output circuits.

One of the output circuits of the second video amplifier stage 11 is coupled to a synchronizing pulse separator stage 13 wherein the synchronizing pulse signals are recovered from the video signal and applied to horizontal and vertical deflection stages 15 and 17 respectively. Therein, potentials suitable for achieving electron beam deflection are developed and applied to a deflection yoke 19 associated with a color cathode ray tube 21. Also, a pulse voltage potential is developed in the horizontal deflection stage 15 which is utilized in a manner to be explained hereinafter.

Another of the output circuits of the video amplifier stage 11 is coupled to a chrominance channel 23 which includes the usual bandpass amplifier, color killer, burst amplifier, color reference oscillator, and synchronous demodulation amplification and matrix network. Therein, three color difference signals, commonly referred to as $B-Y$, $G-Y$, and $R-Y$ signals, are developed and applied by way of output terminals 25, 27, and 29 respectively to the color cathode ray tube 21.

Still another output of the video amplifier stage 11 is applied to a luminance channel which includes the usual delay line 31 wherein the luminance signal is delayed in an amount sufficient to compensate for the signal delay encountered in the chrominance channel 23 and applied to a video output amplifier stage 33. In the video output amplifier stage 33, the usual signal amplification is provided and this amplified signal is coupled to a color cathode ray tube 21.

The color cathode ray tube 21 may be of the well-known shadow-mask variety and includes three electron guns, usually referred to as the blue, green, and red guns, which provide three electron beams. Each of the guns includes a cathode 35B, 35G, and 35R respectively; a control grid 37B, 37G, and 37R respectively, and a screen grid 39B, 39G, and 39R respectively which serve to control the electron beam available from each of the electron guns.

While the above-described color television receiver is typical of numerous presently available receivers, it is well known that the capabilities for manufacturing the color cathode ray tube 21 are limited in many respects. For example, the multiple phosphors utilized in the cathode ray tube 21 do not have uniform efficiencies nor provide a uniform response to electron bombardment. Moreover, the electron guns include variations in such characteristics as electron emission capabilities and cut-off. Thus, apparatus must be provided to compensate for the above-mentioned variations during operational use of the receiver. Also, the color cathode ray tube 21 must be preconditioned or "set-up" preparatory to operational use thereof.

In one preferred form of apparatus providing compensation for the above-mentioned variations in the color cathode ray tube 21, the luminance signal available from the delay line 31 is AC coupled to the control grid of the video output amplifier 33 by way of a capacitor 40 in series connection with a parallel connected inductor 41 and resistor 42. Also, a DC path from the delay line 31 to the control grid of the video output amplifier 33 includes series connected resistor 43, adjustable resistor 44, resistor 45, and the parallel connected inductor 41 and resistor 42. A bias source B— is connected via a resistor 46 to one terminal of the adjustable resistor 44. The junctions of the resistors 43 and 44, and 44 and 46 have appropriate by-pass capacitors coupled to a voltage reference level or circuit ground. Thus, the adjustable resistor or brightness control 44 serves to vary the DC level of the signal obtainable from the video output amplifier 33 which is applied to the color cathode ray tube 21. Further, a control 47 in the cathode circuit of the video output amplifier 33 serves as a contrast control permitting adjustment of the amplitude of the signal available from the video output amplifier 33 and applied to the color cathode ray tube 21.

The output circuit of the video output amplifier 33 includes a direct connection to the cathode 35R of the color cathode ray tube 21 and a load resistor 48 coupled to a voltage source B+. Also a pair of parallel connected adjustable resistors 49 and 51 respectively and a series connected resistor 53 are shunt connected across the load resistor 48. The adjustable arm of each of the resistors 49 and 51 is connected directly to one of the cathodes 35B and 35G respectively of the color cathode ray tube 21. Further, a pulse voltage available from the horizontal deflection stage 15 is coupled via a pair of series connected isolating resistors 55 and 57 and a capacitor 59 to the junction of the parallel connected adjustable resistors 49 and 51 and the resistor 53 connected in series therewith.

Thus, the luminance signals available in the output circuit of the video output amplifier 33 are applied to the cathodes 35R, 35G, and 35B of the color cathode ray tube 21. Moreover, the magnitude of the signal applied to the cathodes 35B and 35G is adjustable by means of the variable resistors 49 and 51 respectively. Further, the pulse voltage, which occurs during the period of retrace of the electron beams, is applied to all of the cathodes 35B, 35G, and 35R and serves to blank the color cathode ray tube 21 during this period.

The color difference signals $B-Y$, $G-Y$, and $R-Y$, available at the output terminals 25, 27, and 29 respectively of the chrominance channel 23, are directly applied to each of the control grids 37B, 37G, and 37R of the color cathode ray tube 21. Also, individual adjustable resistors 61B, 61G, and 61R are connected in parallel intermediate a boosted boost B+ source and a B+ source. Each has an adjustable arm which is directly connected to a screen grid 39B, 39G, and 39R of the color cathode ray tube 21 to provide individual voltage potentials to correct for variations in the cut-off characteristics of each of the three electron guns.

Additionally, a first switch 63 is connected in circuit between the output electrode of the video output amplifier 33 and the junction of the parallel connected adjustable resistors 49 and 51 and the cathode 35R of the color cathode ray tube 21. A second switch 65 is coupled in circuit with the vertical deflection stage 17. Both of the switches 63 and 65 are single pole double throw switches having the usual three terminals.

When the switch 63 is in a first position designated "normal," the luminance signal available in the output circuit of the video output amplifier 33 is applied to the cathodes 35B, 35G, and 35R of the color cathode ray tube 21. Upon movement of the switch 63 to a second position designated "service," the output luminance signal to the cathodes 35B, 35G, and 35R is interrupted.

In a somewhat similar manner, the second switch 65 has a first position designated "normal" whereat a part of the vertical deflection stage 17 is not "short-circuited" and the application of the signal from the vertical deflection stage 17 to the deflection yoke 19 associated with the color picture tube 21 is unaffected. When the second switch 65 is shifted to a second position designated "service," a part of the vertical deflection stage 17 is "short-circuited" to a voltage reference level such as ground and the signal normally applied from the vertical deflection stage 17 to the deflection yoke 19 is interrupted.

As to the operation of the apparatus of FIG. 1, locating both switches 63 and 65 in the "normal" or first position results in the application of a luminance signal to all of the cathodes 35B, 35G, and 35R. In a manner well known in the art, the signal available from the video output amplifier 33 will have a value of black level potential somewhat less than the value of the voltage B+, due to the current conduction through the output amplifier 33. Also, the magnitude of the luminance signal applied to the cathodes 35B and 35G will obviously be dependent upon the settings of the adjustable resistors 49 and 51 respectively. Further, the pulse voltage available from the horizontal deflection stage 15, occurring during the period of scan retrace of the electron beams, is applied to all of the cathodes 35B, 35G, and 35R and serves to blank the color cathode ray tube 21 during the electron beam retrace period. In the usual manner, the electron beam deflection signals available from the vertical deflection stage 17 are applied to the deflection yoke 19.

Additionally, the color difference signals, $B-Y$, $G-Y$, and $R-Y$ available from the chrominance channel 23 are applied directly to the control grids 37B, 37G, and 37R respectively of the color cathode ray tube 21. Also, a DC voltage potential available at each of the adjustable resistor 61B, 61G, and 61R is applied to each of the screen grids 39B, 39G, and 39R.

In order to pre-condition or "set-up" the color cathode ray tube 21, a monochrome signal is applied to the receiver. Also, the "color-killer" circuit in the chroma channel 23 is adjusted to insure that no spurious signals pass through the chrominance channel 23 to the control grids 37B, 37G, and 37R of the color cathode ray tube 21. Thus, the monochrome or luminance signal which is applied to the electron guns of the cathode ray tube 21 by way of the cathodes 35B, 35G, and 35R causes each of the electron guns to provide an electron beam. Moreover, these electron beams are the resultant of the applied luminance or monochrome signal and are unaffected by the disabled chroma channel.

The switches 63 and 65 respectively are shifted from the first or "normal" position to the second or "service" position. Thereupon, the first switch 63 serves to interrupt the application of the luminance signal to the cathodes 35B, 35G, and 35R of the color cathode ray tube 21. Also, the second switch 65 serves to interrupt the application of the vertical deflection signals from the vertical deflection stage 17 to the deflection yoke 19.

Thus, variations in luminance signal intensity do not affect the electron beams of the color cathode ray tube 21 and the electron beams are caused to scan the color cathode ray tube in but one of the possible two substantially normal directions.

Referring to the interruption of the luminance signal by the first switch 63, it has previously been mentioned that the black level provided in the output circuit of the amplifier 33 during normal operation has a value somewhat less than the value of the voltage source B+, due to current conduction through the amplifier 33. Thus, the provision of a substantially similar value of black level reference potential during "set-up" is highly desirable if proper operation and "tracking" of the cathode ray tube electron guns is to be obtained.

It can readily be seen that interruption of the luminance signal by the first switch 63 serves to provide a reference potential for "set-up" which is obtained from a combination of the DC potential available from the voltage source B+ and the voltage pulse potential available from the horizontal deflection stage 15. Referring to FIG. 2, the combining of the voltage pulse with the DC potential available from the voltage source B+ provides a reference potential level during the horizonal scan period having a value less than the value of the voltage source B+. Moreover, this reference potential level is substantially equal to the black level of the signal provided by the video output amplifier 33 during the normal operational trace period of the receiver.

Once having provided a reference potential substantially equal to the black level potential occuring during the trace period of normal operation, variations in cutoff characteristics of the electron guns are compensated for by varying the DC voltage applied to each of the screen grids 39B, 39G, and 39R respectively. Specifically, the DC voltage applied to each of the screen grids 39B, 39G, and 39R is altered by varying the adjustable resistors 61B, 61G, and 61R. Thus, each of the horizontal trace lines produced on the color cathode ray tube 21 is just extinguished.

Thereafter, the switches 63 and 65 are returned to the first or "normal" location whereupon the deflection potentials available from the vertical deflection stage are again applied to the deflection yoke 19 causing the normal scan of the electron beams in both substantially normal directions. Also, the luminance signal resulting from the application of a monochrome signal to the receiver appears at the output of the video amplifier 33. The adjustable resistors 49 and 51 are then varied in an amount sufficient to provide the desired color temperature or whiteness of the brightest parts of the applied monochrome signal.

Thus, apparatus having numerous advantages has been provided for controlling the operation of a color cathode ray tube. For example, the complexity, cost, and power requirements of the present apparatus have been reduced with respect to prior known apparatus due to the fact that a pulse voltage is utilized for the dual purpose of cathode ray tube blanking during the retrace period of operational use and in combination with a fixed DC potential to provide a reference black level during preconditioning or "set-up" of the color cathode ray tube. Moreover, this reduction in complexity, cost, and power requirements is obtained without deleterious effect upon the operational use of the color cathode ray tube or the adjustments and manipulations necessary for pre-conditioning or "set-up" thereof.

While there has been shown and described what is at present considered the preferred embodiment of the invention, it will be obvious to those skilled in the art that various changes and modifications may be made therein without departing from the invention as defined by the appended claims.

What is claimed is:

1. In a color television receiver including a source of luminance signals; a plurality of sources of color difference signals; a color cathode ray tube including a plurality of electron guns each having a cathode, control grid, and screen grid; and means for deflecting electron beams produced by the electron guns in substantially two normal directions during a trace period, said means including means for developing a voltage pulse during a retrace period, the combination comprising:

means for coupling each of said screen grids to an independently adjustable voltage potential;

means for coupling each of said control grids to one of said plurality of sources of color difference signals;

means for coupling each of said cathodes to said source of luminance signals, said means including independently adjustable means for varying the magnitude of the luminance signal applied to at least one of said cathodes; and circuit means coupling all of said cathodes to a voltage pulse source, said voltage pulse source serving to provide a blanking signal for said cathode ray tube during a retrace period and in combination with a DC potential source a reference potential for said cathodes upon interruption of the luminance signal.

2. The combination of claim 1 including switch means for alternatively enabling or disabling the application of said luminance signal to said cathodes of said electron guns, said disabling of the application of said luminance signal being accompanied by the application to said cathodes of a combined reference potential including a fixed DC potential and said voltage pulse.

3. The combination of claim 1 including a first switch means for alternatively enabling or disabling the application of said luminance signal to said cathodes of said electron guns, and second switch means for alternatively enabling or disabling the deflection of said electron beams in one of said two substantially normal directions, said disabling of the application of said luminance signal to said cathodes being accompanied by the disabling of said deflection of said electron beams in one of said substantially normal directions.

4. In a color television receiver including a luminance signal source; a plurality of color difference signal sources; a color cathode ray tube including a plurality of electron guns each having a cathode, control grid, and screen grid; and electron beam deflection means for deflecting the electron beams produced by the electron guns in two substantially normal directions, said deflection means including a voltage pulse developing means, the circuitry combination comprising:

means for coupling each of said screen grids to an independently adjustable voltage potential;

means for coupling each of said control electrodes to one of said plurality of color difference signal sources; and means for coupling said cathodes to said voltage pulse developing means and to said luminance signal source, said means including adjustment means for varying the magnitude of said luminance signal applied to at least one of said cathodes and switch means for alternatively enabling or disabling the application of said luminance signal to said cathodes, said voltage pulse from said developing means serving to blank said cathode ray tube during the retrace period when said switch means enables the application of said luminance signal to said cathodes and serving to combine with a fixed DC potential to provide a combined reference potential at said cathodes upon disablement of the application of said luminance signal to said cathodes.

5. The circuitry combination of claim 4 including a second switch means for alternatively enabling or disabling the electron beam deflection means in one of said two substantially normal directions.

6. The circuitry combination of claim 5 wherein said second switch means is coupled with the first switch means to provide enablement of said deflection means upon enablement of the application of said luminance signal to said cathodes and disablement of said deflection means in one of said two normal directions upon disablement of the application of said luminance signal to said cathodes.

References Cited

UNITED STATES PATENTS

| | | | |
|---|---|---|---|
| 3,062,914 | 11/1962 | Fernald et al. ------- | 178—5.4 |
| 3,114,794 | 12/1963 | Stark et al. --------- | 178—5.4 |

ROBERT L. GRIFFIN, *Primary Examiner.*

R. MURRAY, *Assistant Examiner.*

U.S. Cl. X.R.

178—6